(12) United States Patent
Wittenstein

(10) Patent No.: US 7,484,435 B2
(45) Date of Patent: Feb. 3, 2009

(54) SINGLE- OR MULTI-STAGE EPICYCLIC TRANSMISSION

(75) Inventor: Manfred Wittenstein, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 163 days.

(21) Appl. No.: 11/264,790

(22) Filed: Nov. 1, 2005

(65) Prior Publication Data

US 2006/0096412 A1     May 11, 2006

(30) Foreign Application Priority Data

Nov. 5, 2004   (DE) .................. 10 2004 054 045

(51) Int. Cl.
   *F16H 57/02*   (2006.01)
   *F16H 57/04*   (2006.01)
   *F16H 61/00*   (2006.01)

(52) U.S. Cl. .................................................. 74/606 R

(58) Field of Classification Search ............. 74/606 R
   See application file for complete search history.

(56) References Cited

U.S. PATENT DOCUMENTS

| | | | | |
|---|---|---|---|---|
| 1,901,194 | A * | 3/1933 | Salerni | 475/286 |
| 3,222,954 | A * | 12/1965 | Wuertz | 475/159 |
| 5,171,195 | A * | 12/1992 | Funamoto | 475/342 |
| 6,869,381 | B2 * | 3/2005 | Chang | 475/346 |
| 7,300,376 | B2 * | 11/2007 | Eckert et al. | 475/156 |
| 2006/0194666 | A1 * | 8/2006 | Zimmermann et al. | 475/149 |

FOREIGN PATENT DOCUMENTS

WO     WO 2004077644 A2 *   9/2004

* cited by examiner

*Primary Examiner*—Tisha D Lewis
(74) *Attorney, Agent, or Firm*—Bachman & LaPointe, P.C.

(57) ABSTRACT

In the case of a transmission, in particular a single- or multi-stage epicyclic transmission, with a drive shaft/hub mounted in a core housing of a core transmission and a single- or multi-stage transmission stage(s) adjoining thereto, it is intended that a housing which can be selected as desired and/or an output unit which can be selected as desired can be connected to the core transmission, in particular the transmission stage thereof.

21 Claims, 6 Drawing Sheets

SINGLE- OR MULTI-STAGE EPICYCLIC TRANSMISSION

BACKGROUND OF THE INVENTION (1) Field of the Invention

The present invention relates to a transmission, in particular a single- or multi-stage epicyclic transmission, with a drive shaft/hub mounted in a core housing of a core transmission and (a) single- or multi-stage transmission stage(s) adjoining thereto.

(2) Prior Art

Transmissions of this type, in particular a single- or multi-stage epicyclic transmission, are commercially known and customary in diverse shapes and designs.

These conventional transmissions essentially comprise a housing in which a drive shaft/hub is integrated. The drive shaft/hub drives a single- or dual-stage planet stage to which any desired output unit is adjoined.

For any intended type of transmission, for any intended customers, the drive units have to be specially dimensioned and manufactured in a manner specific to the customer, for example as an output shaft. Depending on the customer's requirements, the entire transmission is therefore permanently changed, which results in high costs relating to the outlay involved in the change and the changing of the manufacturing process.

Each housing of the transmission has to be adapted in a manner specific to the customer, for example in respect of its shape, in respect of its receiving flanges, retaining tabs and outer contour.

The output shafts, output pulleys, output flanges or the like likewise have to be integrated in the transmission in a manner specific to the customer, which likewise requires an involved changing operation during construction and the manufacturing process, which is undesirable.

SUMMARY OF THE INVENTION

The present invention is therefore based on the object of providing a transmission of the type mentioned at the beginning which eliminates the abovementioned disadvantages and with which the housing and/or the output unit can be adapted simply and cost-effectively in a manner specific to the customer, or specific to the user, without considerable additional costs being incurred by the reconstruction or changing of the manufacturing process.

This object is achieved by a housing which can be selected as desired and/or by an output unit which can be selected as desired being connectable to the core housing, and to the core transmission, in particular the transmission stage thereof.

In the case of the present invention, it has proven particularly advantageous to design a single- or multi-stage epicyclic transmission as a core transmission which has its own core housing in which the components, such as, for example, drive shaft/hub, single- or multi-stage planet stages and sun wheel, planet wheels, planet carrier and corresponding bearing elements are integrated.

A core transmission of this type is produced as what is referred to as a universal core transmission, if appropriate with (a) different power stage(s) and different dimensions. All that then needs to be done to this core transmission to meet customer requirements is to push the housing onto the core housing, the housing preferably containing an output unit which can be selected as desired in a manner specific to the customer. This output unit can then be connected to the core transmission, in particular of the planet carrier, the output unit likewise being designed in a manner specific to the customer with regard to type and dimension.

In this case, an output shaft, an output flange, a crown gear, a belt pulley or the like can be provided as the output unit which is connected, for example, to the housing or is adapted via a retaining flange or the like, so that only the housing, retaining flange and output unit have to be reconstructed and adapted in a manner specific to the customer. These can then be connected in a very simple manner as a unit to the universal core transmission by the housing being placed over the core housing of the core transmission, being connected thereto and at the same time the output unit entering into engagement with, for example, the last planet carrier.

Therefore, any desired core transmissions having any desired transmission ratios and dimensions can be produced in the manufacturing process, so that only housings which are specific to the customer together with output units which are specific to the customer have to be placed thereon or fitted thereto in order to obtain a transmission which is specific to the customer. In this case, in particular, the dimension of the housing itself and also its outer contour and/or material composition may be influenced. The housing may be formed from plastic or, if appropriate, from high-grade steel, coated steel or the like in order to meet corresponding customer requirements.

It is also to be borne in mind here that an outer contour of the housing can be designed in the respective regions on the end side in a manner such that it widens in a curved manner outward in order to assist liquids, cleaning liquids or the like, in appropriately dripping off. This is likewise to be included in the scope of the present invention.

If, for example, in the vicinity of the drive unit corresponding receiving flanges for the transmission are desired, then the housing is more solidly dimensioned, and is provided with additional flanges, receiving tabs or the like, with it also being conceivable in the retaining flange to construct corresponding receiving flanges for flange-mounting the entire transmission on any desired consumer with it then being possible for the housing to be of correspondingly thicker design. Also as a result, with one and the same core transmission being used and retained, a universal transmission can be provided which can be produced cost-effectively and in a manner specific to the customer with little structural and little manufacturing outlay.

BRIEF DESCRIPTION OF THE DRAWINGS

Further advantages, features and details of the invention emerge from the description below of preferred exemplary embodiments and with reference to the drawing, in which

FIG. 3b shows a diagrammatically illustrated longitudinal section through the transmission according to FIG. 3a;

DETAILED DESCRIPTION OF THE PREFERRED EMBODIMENT(S)

Figure 1A:
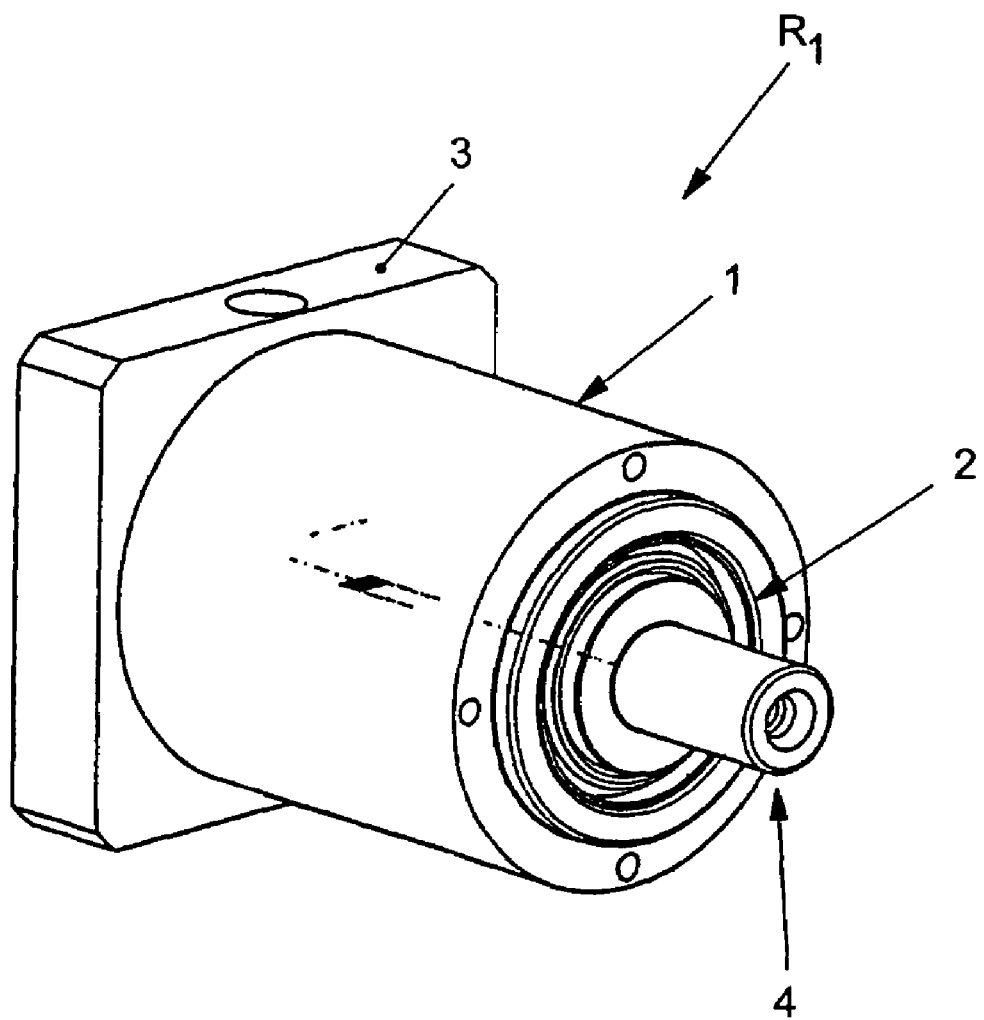
FIG. 1a shows a diagrammatically illustrated, perspective view of a transmission, in particular a single- or multi-stage epicyclic transmission.

According to FIG. 1a, a transmission $R_1$ has a housing 1 in which a single- or multi-stage epicyclic transmission 2 as desired, as is merely indicated diagrammatically, is integrated. In this case, the housing 1 is connected fixedly or redetachably to a flange 3.

At one end of the housing 1, an output unit 4 protrudes therefrom.

Figure 1B:
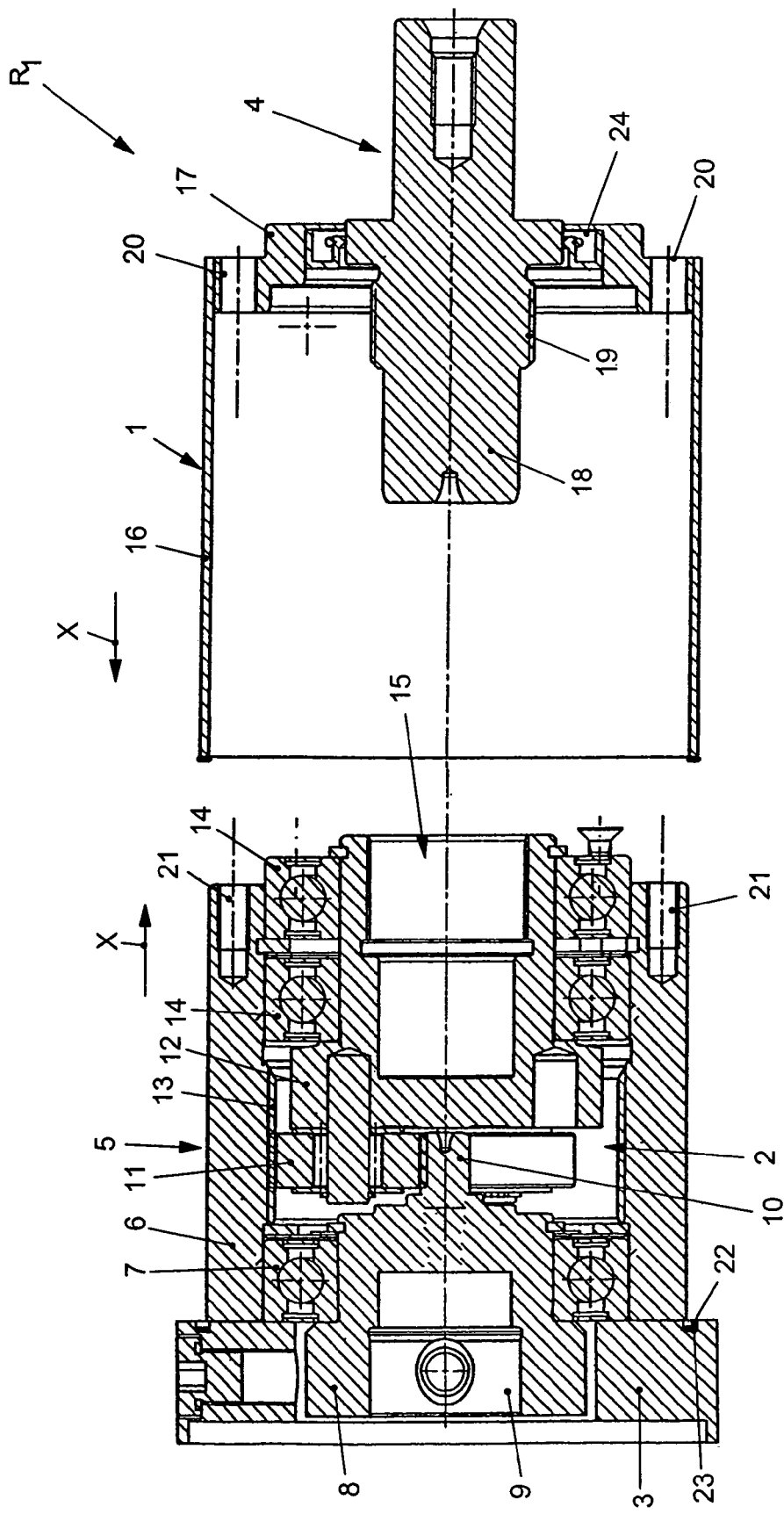
FIG. 1b shows a diagrammatically illustrated partial longitudinal section of a transmission according to FIG. 1a, comprising a core transmission with core housing and a housing which can be connected thereto and has an output unit which can be selected as desired and is integrated therein.

A particular feature of the present invention is shown in FIG. 1b, in which the transmission $R_1$ is formed from essentially two subassemblies which, by being joined together, form the actual transmission $R_1$.

The first subassembly is formed as a core transmission 5 which can be assembled with the second subassembly, the housing 1 with the integrated output unit on the end side.

It is important in the present invention that onto what is referred to as a universal core transmission 5 a housing 1 which can be selected as desired in a manner specific to the customer with preferably an integrated output unit 4 which can be selected as desired can be placed onto the core transmission 5 and the output unit can be connected to the core transmission 5.

In this manner, any desired housing 1 in a wide variety of materials, formed from plastic, acid-proof plastic, from any desired different metals, high-grade steel, acid-proof metals, or a coated housing, or housings designed in a manner specific to the customer with additional flanges, retaining tabs or the like specific to the customer can be placed onto a standardized core transmission 5.

In addition, the output units 4, formed from an output shaft, can likewise be designed as an output flange, as an output gear wheel, as an output belt wheel and can be connected to the housing and can therefore be connected to the core transmission in a manner specific to the user, in particular specific to the customer.

It is therefore always possible for one and the same core transmission 5 to be produced in order to produce any desired, customer-specific transmission $R_1$ with differently desired shapes of the housing 1 and/or customer-specific output units 4.

The core transmission 5 essentially comprises a core housing 6 in which at one end a drive shaft/hub 8 with, if appropriate, an integrated coupling 9 is inserted in a manner mounted rotatably at least via a bearing element 7.

The drive shaft/hub 8 here forms a sun wheel 10 which meshes with at least one planet wheel 11 which sits on the end side of a planet carrier 12 or is mounted there. The planet wheels 11 mesh on the inside with an internal gear 13 formed from the core housing 6 of the core transmission 5.

The planet carrier 12 is mounted within the core housing 6 via preferably two bearing elements 14 arranged next to each other. The planet carrier 12 is preferably provided at one end with an insertion opening 15. The core housing 6 is connected fixedly or redetachably to the flange 3 and overall forms the core transmission 5.

In the case of the present invention, it has proven advantageous to push onto this universally formed core transmission 5 or core housing 6 a housing 1, which is designed in a manner specific to the customer with regard to material composition, outer contour 16, if appropriate with add-on parts (not illustrated specifically), such as flanges, retaining tabs or the like, in a precisely fitting manner onto the core housing 6, it being possible for the housing 1 to be pushed coaxially and in an exactly fitting manner onto the core housing 6 of the core transmission 5.

In the present exemplary embodiment, a retaining flange 17 is inserted fixedly or redetachably on the end side in the housing 1, the retaining flange 17 serving to receive the output unit 4, which is designed in the present exemplary embodiment as an output shaft.

The output unit 4 engages by means of a shaft extension 18 and a toothing 19 in the insertion opening 15 of the planet carrier 12 in an exactly fitting and form-fitting manner when the housing 1 with the output unit 4 integrated is pushed onto the core transmission 5 in the arrow directions x illustrated.

Corresponding passage bores 20 which are aligned with threaded bores 21 of the core transmission 5, which threaded bores are correspondingly provided on the end side, are provided in the retaining flange 17.

In the present exemplary embodiment, the housing 1 is connected via the retaining flange 17 redetachably to the core transmission 5 in which fastening screws or the like (not illustrated specifically here) produce a fixed connection.

In this case, the housing 1 engages at one end in a corresponding annular groove 22 containing an inserted seal 23 of the flange 3, and is mounted in the annular groove 22 and produces a leakproof connection or seal.

The output unit 4 which can be selected as desired is inserted as an output shaft within the retaining flange 17, a sealing element 24 sealing off the housing 1 at the other end.

Figure 1C:
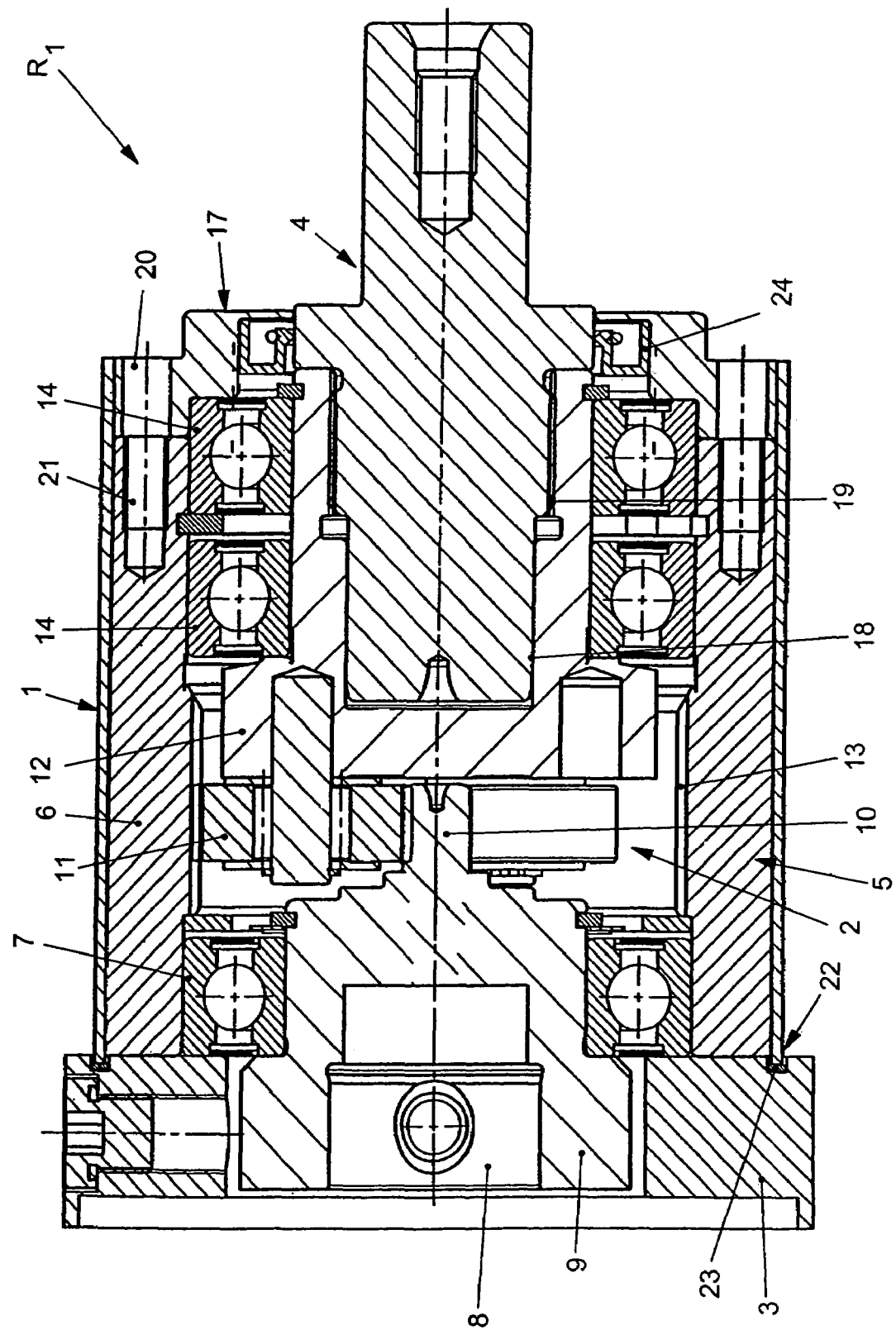
FIG. 1c shows a diagrammatically illustrated longitudinal section through the transmission according to FIG. 1b in an assembled construction.

FIG. 1c illustrates the finished transmission $R_1$, the housing 1 with retaining flange 17 and output unit 4 being fixedly connected or joined to the actual core transmission 5. In this case, the output unit 4 is connected to the planet carrier 12 in a form-fitting manner, the intention here being for a shaft-hub connection, a toothed ring connection, an adhesive bond, a press connection, shrink fit, welding or even screwing to be possible as connecting means. This is likewise to lie within the scope of the present invention.

Figure 2:
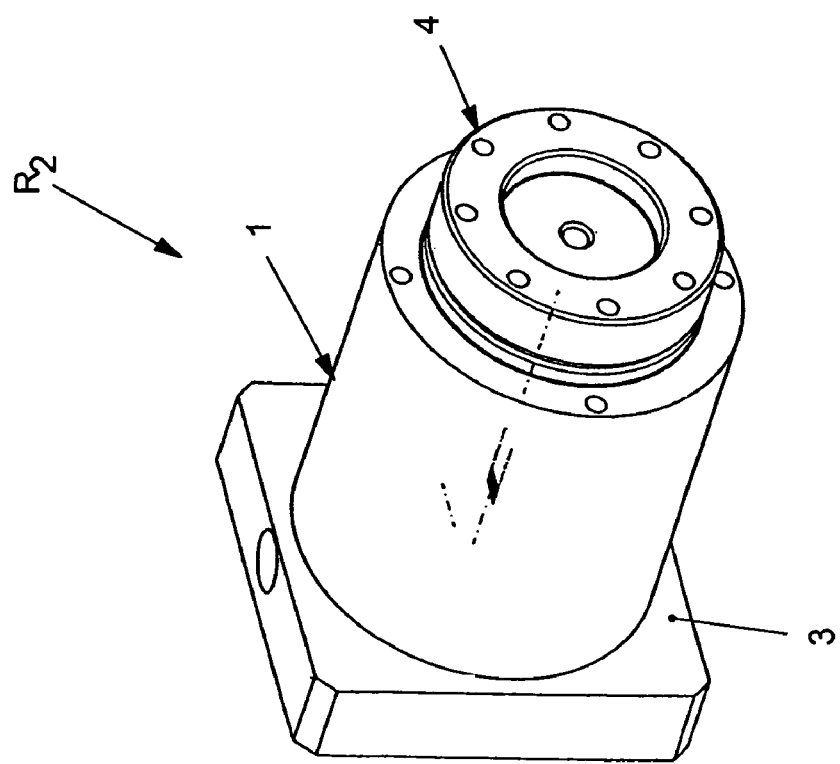
FIG. 2 shows a diagrammatically illustrated, perspective view of a further exemplary embodiment of the transmission according to FIG. 1a, with a further output unit.

An exemplary embodiment of the invention according to FIG. 2 shows a transmission $R_2$, in which, for example, the output unit 4 is designed as a disk-like flange. The housing 1 is connected in the previously described manner to the core transmission 5 (not illustrated specifically here).

Figure 3A:
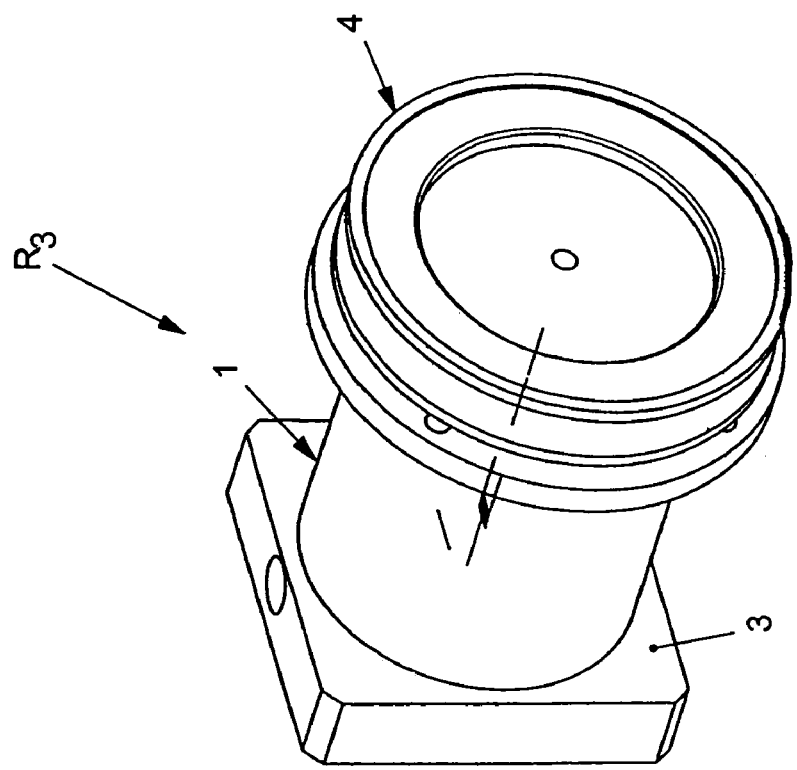
FIG. 3a shows a diagrammatically illustrated, perspective view of a further exemplary embodiment of a transmission according to FIGS. 1a and 2.

The exemplary embodiment of the present invention according to FIG. 3a shows a transmission $R_3$ which corresponds approximately to the type mentioned at the beginning. The output unit 4 there is designed as a belt pulley, as is illustrated in greater detail in FIG. 3b.

Figure 3B:
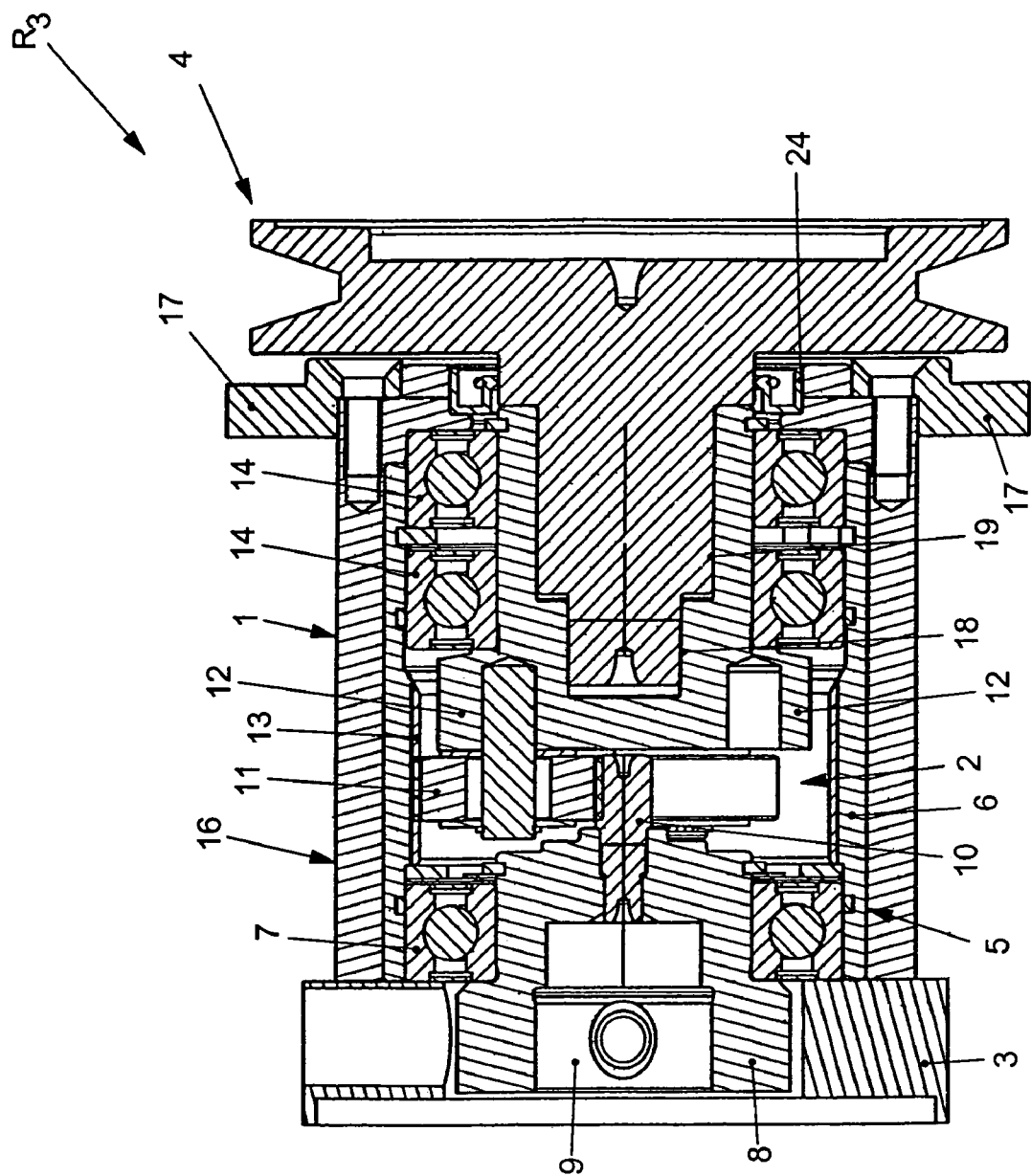

As FIG. 3b illustrates and shows, the retaining flange 17 and the housing 1 can be designed in a manner specific to the customer, the housing 1 in the present case being more strongly dimensioned and the transmission $R_3$ being fixable or flange-mountable, if appropriate via the retaining flange 17 of reinforced design, for a specific use.

It is important, however, in the case of the present invention that the core transmission 5 is essentially universally obtained and only the output unit 4, housing 1 and, if appropriate, retaining flange 17 are optimized or changed in a manner specific to the customer and user. However, the core transmission 5 may be of the abovementioned type.

It is also important in the present invention that, in the case of the transmission $R_1$, $R_2$ and $R_3$ as an epicyclic transmission 2, a single- or multi-stage epicyclic transmission 2 can be integrated or inserted in the core transmission 5. The output unit 4 then engages, in each case in the last stage, with the last planet carrier 12 in the previously described manner.

Figure 4:
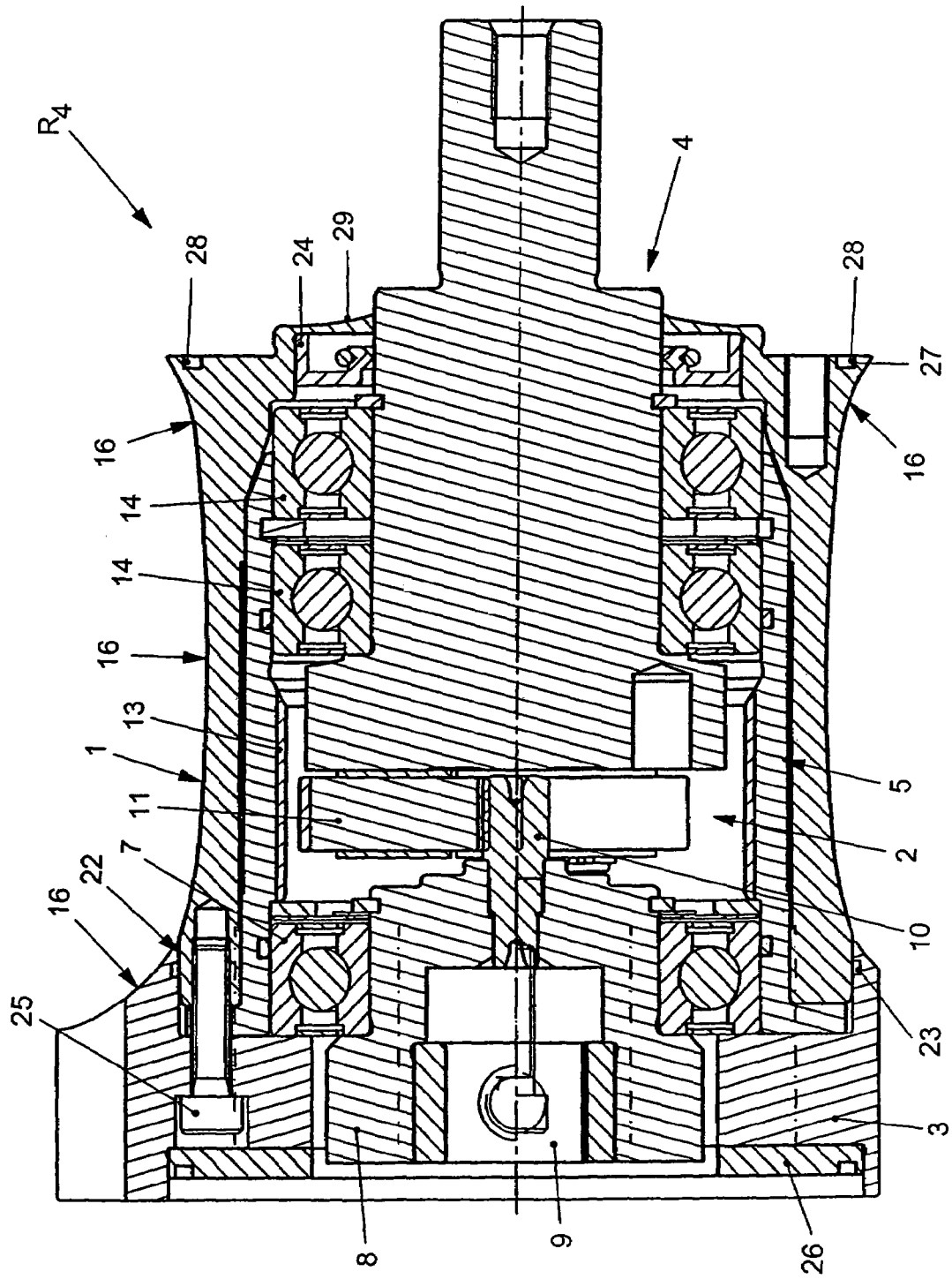
FIG. 4 shows a diagrammatically illustrated longitudinal section of a further exemplary embodiment of a transmission according to FIGS. 1c and 3b.

In the case of the last exemplary embodiment of the present invention according to FIG. 4, a transmission $R_4$ is shown which corresponds approximately to the type mentioned at the beginning.

The difference here is that the customer-specific output unit 4 has already been integrated in the core transmission 5, and on the core transmission 5 with integrated output unit 4, which can be selected as desired and in a manner specific to the customer, the housing 1 can merely be placed onto the core housing 6 coaxially and in an exactly fitting manner.

At least one sealing element 24 is inserted in the end-side region of the housing 1 and undertakes the sealing off of the housing 1 from the output unit 4.

However, in the present exemplary embodiment, the housing 1 is connected to the flange 3 or to the core transmission 5 via at least one fastening element 25.

In the present exemplary embodiment, core housing 6 and housing 1 are inserted into an annular groove 22 of the flange 3, which annular groove encircles on the end side, and are sealed off to the outside via corresponding seals 23.

The fastening elements 25 are also closed to the outside in the flange 3 via a sealing ring 26.

It has proven particularly advantageous in the case of the present exemplary embodiment that an outer contour of the housing 1 is widened outward in the respective regions on the end side, and also in the region of the flange 3, in order, for a specific application, to facilitate a dripping off of liquids, water, cleaning agents or the like. In this case, an outer contour 16 of the housing 1 merges widened in a curved manner to the outside into a curved outer contour of the flange 3. This is likewise to lie within the scope of the present invention.

Furthermore, it has proven advantageous in the case of the present invention to insert a sealing element 28, in particular an O-ring, into an encircling groove in an end side 27 of the housing 1. This provides an additional sealing for the flange-mounting of the transmission $R_4$, so that no dirt, liquids, cleaning agents or the like pass into the region of the output device 4. In addition, the housing 1 has on the end side a labyrinth seal 29 which produces a seal with respect to the output unit 4.

What is claimed is:

1. A transmission with a drive shaft/hub mounted in a core housing of a core transmission and a single- or a multi-stage transmission adjoining thereto, wherein at least one of a first housing and an output unit is connected to a transmission stage of the core transmission and wherein the first housing is pushed in an exactly fitting manner coaxially over the core housing and is connected fixedly or redetachably to the core housing of the core transmission.

2. The transmission as claimed in claim 1, wherein the first housing and the output unit are connected as a unit to the core housing of the core transmission, to form a single- or multi-stage epicyclic transmission.

3. The transmission as claimed in claim 1, wherein the output unit is connected fixedly or redetachably to the first housing, and is inserted into a last transmission stage of the core transmission, and is fixedly or redetachably to the last transmission stage.

4. The transmission as claimed in claim 1, wherein the output unit is one of an output shaft, an output flange, an output pulley, and an output bevel gear.

5. The transmission as claimed in claim 1, wherein the first housing is of a cylindrical design with an outer contour.

6. The transmission as claimed in claim 1, wherein the first housing has at least one of selectable, customer-specific shapes, fastening flanges, and retaining tabs.

7. A transmission with a drive shaft/hub mounted in a core housing of a core transmission and a single- or a multi-stage transmission adjoining thereto, wherein at least one of a first housing and an output unit is connected to a transmission stage of the core transmission and wherein the first housing is an outer housing which engages coaxially and in an exactly fitting manner over the core housing of the core transmission and the outer housing is formed from a material selected from the group consisting of such high-grade steel, a plastic material, coated metals, and acid-proof coatings.

8. The transmission as claimed in claim 1, wherein the output unit is held on an end of the first housing via a retaining flange, with a sealing element inserted between the retaining flange and the output unit.

9. A transmission with a drive shaft/hub mounted in a core housing of a core transmission and a single- or a multi-stage transmission adjoining thereto, wherein at least one of a first housing and an output unit is connected to a transmission stage of the core transmission and wherein the output unit is integrated in the core transmission and the first housing with an integrated sealing element on an end side is placed over the core housing.

10. The transmission as claimed in claim 1, wherein the output unit engages with the first housing which is in a planet carrier of a last transmission stage and is connected fixedly or redetachably to said planet carrier in a form-fitting and/or frictional manner.

11. The transmission as claimed in claim 10, wherein the drive shaft/hub is mounted within the core housing of the core transmission, via at least one bearing and has a sun wheel on an end side.

12. The transmission as claimed in claim 11, wherein the sun wheel of the drive shaft/hub meshes with at least one planet wheel of the planet carrier.

13. The transmission as claimed in claim 12, wherein the at least one planet wheel is in engagement on an inside in the first housing with an internal gear and meshes with the internal gear.

14. The transmission as claimed in claim 13, wherein the drive shaft/hub has a coupling.

15. The transmission as claimed in claim 14, wherein the planet carrier is mounted via at least one bearing element provided within the core housing and arranged next to one another.

16. The transmission as claimed in claim 15, wherein the core transmission is formed from essentially the drive shaft/hub of the single- or multi-stage transmission stage integrated in the core housing.

17. The transmission as claimed in claim 15, wherein the core transmission is formed from the drive shaft/hub with adjoining sun wheel, the at least one planet wheel, the planet carrier and the core housing.

18. The transmission as claimed in claim 9, wherein the output unit is one of an output shaft, an output flange, an output pulley, a belt pulley, and an output gear wheel and is inserted fixedly or redetachably in a planet carrier.

19. A transmission with a drive shaft/hub mounted in a core housing of a core transmission and a single- or a multi-stage transmission adjoining thereto, wherein at least one of a first housing and an output unit is connected to a transmission stage of the core transmission and wherein an outer contour at one end of the first housing is widened in a curved manner outward in a region of the output unit and at another end is widened in a curved manner in a region of a flange, with, the outer contour of the first housing continuing to be widened in a curved manner outward in a flange-side region and in the region of the flange.

20. The transmission as claimed in claim 1, wherein at least one sealing element is inserted in a groove in an end side of the first housing and the groove is of a radially encircling design.

21. The transmission as claimed in claim 20, wherein the end side of the first housing is adjoined by a labyrinth seal which produces a seal with the output unit.

* * * * *